US006909491B2

(12) United States Patent
Morton et al.

(10) Patent No.: US 6,909,491 B2
(45) Date of Patent: Jun. 21, 2005

(54) ELECTRONIC AND FILM THEATRICAL QUALITY

(75) Inventors: Roger A. Morton, Penfield, NY (US); Gabriel Fielding, Webster, NY (US); Michelle A. Maurer, Rochester, NY (US); Christopher L. Dumont, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 316 days.

(21) Appl. No.: 10/285,921

(22) Filed: Nov. 1, 2002

(65) Prior Publication Data

US 2003/0086065 A1 May 8, 2003

Related U.S. Application Data

(60) Provisional application No. 60/335,327, filed on Nov. 2, 2001.

(51) Int. Cl.$^7$ ........................... G03B 19/18; G06T 15/00
(52) U.S. Cl. .......................................... 355/38; 345/419
(58) Field of Search ........................... 352/38, 39, 244; 348/97, 241; 345/419

(56) References Cited

U.S. PATENT DOCUMENTS 6,208,348 B1 * 3/2001 Kaye .......................... 345/419
2002/0109788 A1   8/2002 Morton et al. .............. 348/625

OTHER PUBLICATIONS

"The Results of Subjective Tests on the Perceived Quality of Commercial Motion Picture Film Formats" by R. Evans Wetmore and Robert C. Hummel, SMPTE Journal, pp. 274–278, May 1999.
"Hands–on Manual for Cinematographers" by David Samuelson, 2nd Ed., Focal Press, 1999, p. 32.
Arriflex brochures.
Canon brochure.
"Human Color Vision" by Robert M. Boynton, Optical Society of America, pp. 176–179.
Multiframe Wiener Restoration of Image Sequences by M.K. Ozkan, M.I. Sezan, A.T. Erdem, and A.M. Tekalp in *Motion Analysis and Image Sequence Processing*, edited by M.I. Sezan and R.L. Lagendjik, Kluwer Publishers, 1993.
"Adaptive motion–compensated filtering of noisy image sequences" by M.K. Ozkan, M.I. Sezan, and A.M. Tekalp. IEEE Transactions on Circuits and Systems for Video Technology, vol. 3, No. 4, Aug. 1993, pp. 277–290.

* cited by examiner

*Primary Examiner*—Rodney Fuller
(74) *Attorney, Agent, or Firm*—Stephen H. Shaw (57) ABSTRACT

A method is described for processing motion picture scene data through a process in which the scene data is initially acquired from a film or an electronic camera and ultimately projected onto a screen, wherein image losses potentially occur during distribution and projection stages of the process. The method includes the steps of: (a) representing the scene data in a non-linear space; and (b) compensating for the image losses associated with the distribution and projection stages at a point in the process before they occur by converting the scene data into an intermediate space representing the space in which the losses occur and filtering the scene data in the intermediate space to compensate the scene data for the losses. Additional steps provide additional benefits, including the steps of: (a) digitally scaling the digital scene data anamorphically to provide an image that makes full use of the available film space on the film; (b) recording multiple intermediate prints from the digital scene data and performing a single printing step to make each release print from an intermediate print; and (c) using motion compensated frame averaging to digitally remove noise.

35 Claims, 4 Drawing Sheets

ELECTRONIC AND FILM THEATRICAL QUALITY

CROSS REFERENCE TO RELATED APPLICATION

Reference is made to and priority claimed from U.S. Provisional Application Ser. No. 60/335,327, filed 02 Nov. 2001, entitled "IMPROVING ELECTRONIC AND FILM THEATRICAL QUALITY".

FIELD OF THE INVENTION

The invention relates generally to the field of motion picture photography, and in particular to the transfer of motion picture film to a digital intermediate signal.

BACKGROUND OF THE INVENTION

During the 1990's, motion imaging digital effects were tailored to match the quality of traditional 35-mm film processes. Subsequently, digital effects processes expanded into long form digital intermediate, that is, the transfer of long stretches of motion picture film into a digital intermediate state. This allows high speed processing of an entire feature film, while preserving the quality and look of the optical film process. However, the process as heretofore practiced maintains the quality and look of the existing system, that is, a current 35 mm film system. More recently, and in connection with the present invention, systems analyses have indicated an opportunity to distribute to theaters film or digital images that provide a significant increase in overall theatrical image quality, which would be obtained by introducing a new generation of digital intermediate. The preferred approach uses current 35-mm film, and involves modest changes in production costs and theater equipment.

Consequently, by exploiting advances in digital technology, and by using new algorithms and high-speed, high-resolution scanning and recording, it is possible to give film a clearly superior look relative to other imaging products. Similarly, pre-compensating for artifacts and losses in digital electronic projectors can be achieved in postproduction.

The present invention identifies a menu of system changes and component developments that can, based on systems analysis, significantly improve the quality of the current processes.

SUMMARY OF THE INVENTION

The present invention is directed to overcoming one or more of the problems set forth above. Briefly summarized, according to one aspect of the present invention, a method (and a corresponding system) for processing motion picture scene data through a process in which the scene data is initially acquired from a film or an electronic camera and ultimately projected onto a screen, wherein image losses potentially occur during distribution and projection stages of the process, comprises the steps of: (a) representing the scene data in a non-linear space; and (b) compensating for the image losses associated with the distribution and projection stages at a point in the process before they occur by converting the scene data into an intermediate space representing the space in which the losses occur and filtering the scene data in the intermediate space to compensate the scene data for the losses.

In another aspect of the invention, the method comprises the steps of: (a) using digital filtering of the digital scene data to pre-compensate for losses before they occur in distribution and projection; (b) digitally scaling the digital scene data anamorphically to provide an image that makes full use of the available film space on the film; and (c) projecting the image on the screen, thereby providing an enhanced image on the screen.

In yet another aspect of the invention, the method comprises the steps of: (a) using digital filtering of the digital scene data to pre-compensate for losses before they occur in distribution and projection; (b) recording multiple intermediate prints from the digital scene data and performing a single printing step to make each release print from an intermediate print; and (c) projecting the release print on the screen, thereby providing an enhanced image on the screen.

In still another aspect of the invention, the method comprises the steps of: (a) using motion compensated frame averaging to digitally remove noise; (b) using digital filtering of the digital scene data to pre-compensate for losses before they occur in distribution and projection; and (c) projecting the image on the screen, thereby providing an enhanced image on the screen.

As mentioned above, the advantage of the invention is that, by exploiting the several components of the aforementioned method, and by using new algorithms and high-speed, high-resolution scanning and recording, it is possible to give film a clearly superior look relative to other imaging products. Similarly, pre-compensating for artifacts and losses in digital electronic projectors can be achieved in postproduction.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Because digital intermediate stages for motion picture processing, especially post production processing, are well known, the present description will be directed in particular to elements forming part of, or cooperating more directly with, a method and/or system in accordance with the present invention. Elements not specifically shown or described herein may be selected from those known in the art. Certain aspects of the embodiments to be described may be provided in software. Given the method and/or system as shown and described according to the invention in the following materials, software not specifically shown, described or suggested herein that is useful for implementation of the invention is conventional and within the ordinary skill in such arts.

Figure 1:
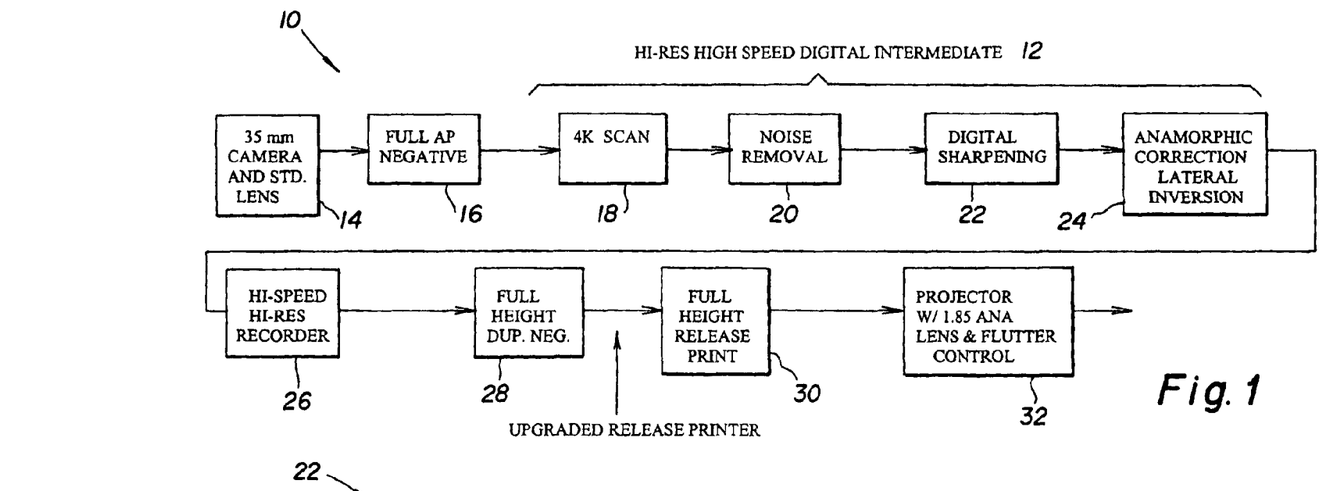
FIG. 1 is a block diagram of a system configured to implement the improvements according to the invention.

Before considering how each of the key elements of a system can be improved according to the invention, an overall digital systems framework to effect these improvements needs to be defined. FIG. 1 shows a block diagram of an "ideal" system 10 configured as shown so as to implement the improvements provided according to the invention. Here the term "ideal" means that, while each of the improvements described herein would ideally be available, not all need be implemented to achieve the characteristics of a desired 70-mm quality reported in the literature (e.g., see a study undertaken by Wetmore and Hummel, and reported as "The Results of Subjective Tests on the Perceived Quality of Commercial Motion Picture Film Formats", *SMPTE Journal*, pp. 274–278, May 1999, which shows the types of noticeable changes in image quality that can occur between film formats.) It is expected that implementing all of the stages and steps shown in FIG. 1 would provide an image quality significantly beyond 70-mm quality, and could even exceed a hypothetical 4K all digital system.

Referring to FIG. 1, a high-resolution, high-speed digital intermediate section 12 transfers a photographic input captured by a full aperture 35-mm camera 14 into a digital intermediate signal. The camera 14 is used to capture a full aperture negative 16 that is scanned using a 4K scanner 18, which is the first component of the high-resolution high-speed digital intermediate system 12. The data resulting from the 4K scan is processed in a digital sharpening module 22, which performs sharpening and multiple 11×11 FIR filtering or aperture correction functions. Noise is also removed either before (as shown in FIG. 1) or after sharpening in a noise removal stage 20 using motion compensated noise filtering. This step reduces the amount of noise or grain in the image. Additional digital functions including lateral inversion and anamorphic scaling may also be performed in a correction and inversion stage 24. The resulting data is written out on film using a high-speed, high-resolution recorder 26, which is fast enough to be able to print all the duplicate negatives 28 necessary to have a final release print 30 in one printing step. These negatives are printed full height, that is, the image uses the full space between frames on the film. Finally, the image is projected in a projector 32 with a 1.85 (aspect ratio) anamorphic lens and focus control. In the preferred embodiment of the invention, the projector 32 provides automatic focus of the projected image.

The block diagram shown in FIG. 1 provides the tools for producing a range of looks, many of which may not be filmic. More specifically, the block diagram identifies steps that are needed to achieve a higher quality look defined in terms of an "equivalent quality film gate area" at a film gate of the projector 32. By modeling the appearance of film at specific gate areas, this system can produce a look that remains filmic. In other words, as the well-known IMAX projection system has shown, an increase in film area results in a higher quality film look. By emulating this increase in area electronically, the present system can maintain the integrity of the look. Thus, the present system provides the appearance of greater film area while preserving a 35-mm film format. Each one of the key elements of the present system will now be discussed, including acutance, grain and noise, steadiness, and issues around dirt (on the film and on components contacting the film).

Acutance

Acutance contributes to an overall perception of sharpness (contrast can also affect perceived sharpness—however, the cost of increasing contrast is a loss of detail in other portions of the tonal range). Acutance is determined from the area of the modulation transfer function of the overall system. Therefore, it may be assumed that matching the modulation transfer function of a 70-mm film system with a 35-mm film system will produce the same perceived acutance if contrast is held constant, i.e., the same sharpness will be produced.

Why is the acutance of a 70-mm system higher than that of a 35-mm system? The simple answer has two parts. Firstly, the exposed area of 70-mm film through the entire chain of negative intermediates and release print is increased by a factor of 3.43 when compared to 35 mm's 1.85 aspect ratio format. This increase in area means that more detail can be represented within each frame. Secondly, the heating effect on the film in the gate is less in a 70-mm system because the same amount of light is passing through a larger area than in 35-mm film. Consequently, to achieve 70-mm quality in the present system, other ways must be found to improve 35-mm acutance to the 70-mm level. These ways are listed below. Not all are needed to achieve the 8 JND's of acutance improvement from that which is evident between 35-mm (1.85) film and 70-mm film. (Acutance is measured in units of a "just noticeable difference" or JND. One JND is considered distinguishable in a side by side comparison by 90% of observers. Depending on the viewing condition, observers will remember images viewed at different times if they have JND differences in the 5 to 10 range.)

Shooting 35 mm in Full Aperture Format

Shooting 35-mm full aperture increases film area and therefore more detail is captured on the film. This approach is attractive because many 35-mm movie cameras can shoot full aperture. The conversion of a 35 mm movie camera from standard aperture to full aperture generally involves three steps. Firstly, the size of the film gate must be changed. Secondly, because the difference between standard aperture and full aperture is that in full aperture the image is expanded to include the area that on the film is set aside for the soundtrack, the lens must be recentered to the center of the full aperture. Finally, the viewfinder must be able to accommodate the area of the full aperture. Specifically, the Aäton 35, Arriflex 435, Arriflex 535 and Arriflex 535B can be changed from standard to full aperture (see David Samuelson, *Hands-on Manual for Cinematographers*, 2d Ed., 1999, page 32, and Arri brochures, specifically *Arriflex* 435, *Arriflex* 535 and *Arriflex* 535B brochures.)

Scanning with Non-Linear Encoding Methods

In the case of electronic capture, a camera employing a charge coupled device (CCD) sensor and digital electronics scans the scene. In the case of film, a high resolution film scanner is used to scan the film. Because the eye is able to capture without accommodation a brightness range of one million to one, or 6 log units (see Boynton, *Human Color Vision*, pp. 176–179), it requires in linear intensity space at least 20 bits of binary data per color to represent the intensity of the scene. Thus, 60 bits of data would be required for storing each pixel value. This is a prohibitive amount of data. Fortunately, because the eye is close to logarithmic, non-linear encoding methods such as gamma and logarithmic functions can reduce the amount of data to about 10 bits per color or a total of about 30 bits.

Application of Sharpening

This step provides restoration of lost detail by increasing the amount of detail without changing tone or contrast. It involves digital filtering of the scanned image data. With today's electronics, it can be implemented quite inexpensively.

In general, the technique according to the present invention compensates for the image losses associated with the stages of the system shown in FIG. 1, particularly but not exclusively the distribution and projection stages, at a point in the process before they occur. This is accomplished by converting the scene data into an intermediate space representing the space in which the losses occur and filtering the scene data in the intermediate space to compensate the scene data for the losses. More specifically, the purpose of this sharpening is to apply pre-compensation for downstream losses in the film system, including loss of sharpness in the recorder, as well as losses in the printing and projecting steps.

Thus, in order to achieve satisfactory pre-compensation it is necessary that, at least over the central region of the tone scale, the filtering be applied in the same tone scale or color space as the losses in sharpness that are being compensated for. This not only involves conversion to a different color space, but it also requires that there be no loss of precision as a result of the conversion. This means that the conversion into say a linear exposure space of the printer and recorder (each of these may have a different space for compensation) must be performed so that the compensation is the direct inverse or reciprocal of the losses which will occur downstream. Because most losses, such as light scatter, diffraction or aberration or limited spot size, loss of focus and some other effects, occur in a manner which is directly proportional to light intensity, these conversions are into a linear-like space which will inevitably require higher precision of binary representation for the filter function. This increased precision may be achieved by either using floating point calculations or by using more than 10 bits—typically 16 to 24 bits—of binary data per color.

Figures 2, 3:
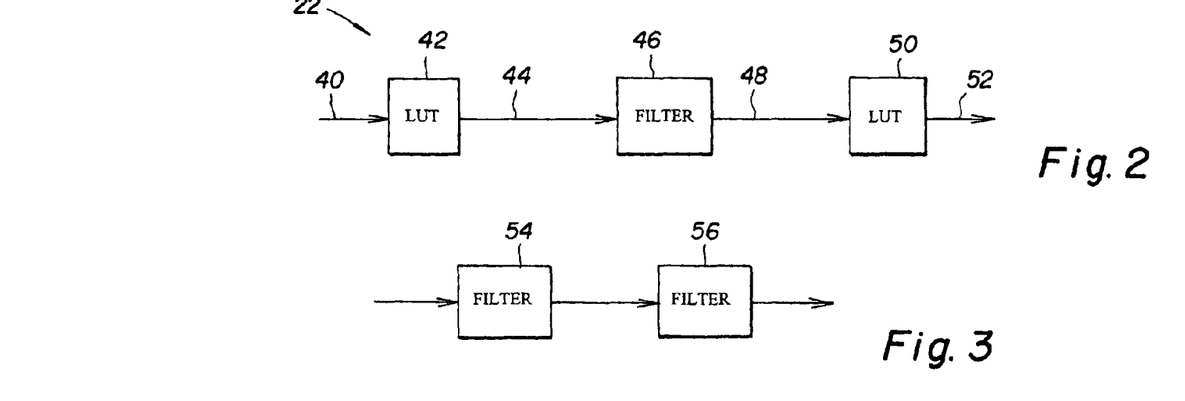
FIG. 2 is a block diagram of the digital sharpening stage shown in FIG. 1.
FIG. 3 is a block diagram of a series of filter stages as shown in FIG. 2.

Further detail of the digital sharpening module 22 is shown in FIG. 2. The object of the sharpening module is to compensate for the image losses associated with distribution and projection at a point in the process before they occur by converting the scene data into an intermediate space representing the space in which the losses occur and filtering the scene data in that intermediate space to compensate the scene data for the losses. Image data enters the pre-compensation sharpening filter on line 40; this data is typically 10 bit data as represented in a non-linear space, as described above. The data is then applied to a look up table 42, which outputs the image data in the space corresponding to the space where the losses will subsequently occur in the system chain. Thus, because the data is in more of a linear space on the output line 44 of the look up table 42, the data will, of necessity, be either floating point or between 16 or 24 bits of linear data. This data then passes into the filter 46, which may be a convolution filter or a 2 DIR filter. This filter 46 may use an un-sharp architecture and may involve changing coefficients as a function of the intensity of the signal in order to achieve an accurate compensation of the subsequent losses. The filtered and sharpened data then passes through a line 48 to a look up table 50 that is the inverse of the look up table 42, and data is output therefrom on a line 52.

Constructing the table 50 requires special care to ensure that there are no missing values. One approach is to use a large look up table for each color; thus, if 16-bit data is processed a 64K word look up table is used and if 24 bit data is used then a 16 M word look up table is required. If floating point data is used, then it is impractical to use a look up table for all values. Other approaches need to be pursued, such as a sparse look up table with bi-linear or bi-cubic interpolation. Alternatively, a look up table may be used with as many entries as possible to output values on the line 52. The entries within the table are floating point or 16 bit data. A search is performed to find the pair of consecutive entries that span the value on the input line 48. Thus, one entry must be greater than the value on line 48 and one must be less. If this basic approach is adopted then the search can be accelerated by using a high order bit index addressing scheme after converting the floating point number into a 16 bit or higher binary integer word.

The test of the success of the design is that there are no missing values among all possible values on the output line 52 and, of course, that if the line 44 is directly connected to the line 48, thereby bypassing the filter 46, the output value on the line 52 is identical to input values on the line 40.

If different downstream functions introduce losses in different color spaces, then it may be necessary to repeat the process shown in FIG. 2 for each of the different losses, converting the image data into the space in which each downstream process introduces the losses and using a filter in that space which compensates for the losses of the specific process being corrected. These filter blocks are then placed in series as shown in FIG. 3 for corrections in two processes involving two color spaces, where a filter block 54 corresponds to the functions in FIG. 2 compensating for the first process and a filter block 56 corresponds to the functions in FIG. 2 compensating for a second process. Clearly, additional filter blocks (not shown) may be provided for additional processes. The order of applying the compensations depends on the nature of the processes; however, a preferred embodiment compensates for the last process first. Thus, the block 54 would compensate for the last process in the system while the block 56 would compensate for the $2^{nd}$ last process in the system, and so on.

Recording

Once the image data has been precompensated for subsequent losses the image may be recorded onto film at a sufficient resolution so as to not introduce additional artifacts. However, in the present method in which scene data is acquired from a film camera that exposes consecutive frames of the film and the digital scene data is acquired from a scanner that scans the consecutive frames of the film and the digital data is recorded back onto frames of film by a recorder, further improvements can be obtained by electronically removing unsteadiness in either the film scanner, the camera, or the recorder, or any combination of them, by digitally processing the image to remove motion between consecutive frames. For instance, if the recorder 26 is known at the time of processing, then the unsteadiness characteristics of the recorder may be pre-compensated frame by frame in a digital processor (e.g., one of the processors 20, 22 or 24 in the digital intermediate stage 12) to produce a more steady film. This involves specifying the start image of the recorder 26 at a specific frame and measuring the frame by frame unsteadiness of the recorder.

Removing Two Printing Steps by Recording Multiple Intermediate Prints

Much of the loss of detail occurs in the multiple printing steps involved in today's printing processes. According to the present invention, where the digital scene data is transferred to a release print for projection, multiple printing steps are avoided by recording multiple intermediate prints from the digital scene data and performing a single printing step to make each release print from an intermediate print. Consequently, referring to FIG. 1, by using a high speed recorder 26 to make multiple intermediate prints (IP's), these multiple optical printing steps can be avoided and detail is preserved.

Upgrading Current Release Printing

Some detail is also lost in the final release printing process. Steps could be taken to reduce this loss by upgrading the current release printing process.

Providing a New Gate Design

Figure 4:
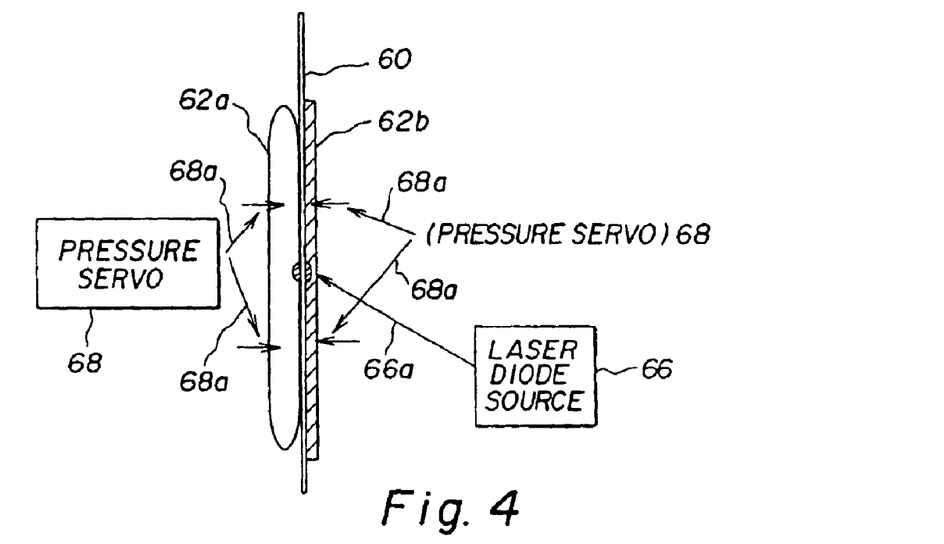
FIG. 4 is a diagram of a film gate used in the projector shown in FIG. 1.

The focus variation and flutter in the film gate of the projector 32 is a source of loss of detail. As shown in FIG. 4, techniques exist for reducing this loss by controlling the movement of the film 60 in the gate 62. These techniques break into two types, as follows:

An active control where a servo system controls the position of the film 60, such as is shown in FIG. 4. The gate 62 includes a gate tension band 62a and a gate pressure plate 62b. Beams 66a from a laser diode source 66 are sensed, which identify the position of the film 60, and the sensed information is used to drive an air pressure servo system 68. Streams 68a of air pressure from the air pressure servo-system 68 maintain the film position. The ideal film shape is not flat, but curved because, when curved, film is more rigid. The lens design for a projection lens 70 would compensate for this curvature by incorporating a focal plane of the same curvature.

Passive control of flutter is achieved by heating the film uniformly across the gate. Thus, expansion from heating the central area of film in the gate is compensated for by expansion around the periphery of the film frame.

Projecting a 1.85 Format with an Anamorphic Lens

Film area in the projector gate for 1.85 aspect ratio format is substantially smaller in height than the available distance between consecutive frames. Because larger film areas result in more detail and less flutter, it is advantageous to increase this area by increasing image height. A projection lens 70 that has a magnification in the vertical direction smaller than the magnification in the horizontal direction will achieve this. This so-called anamorphic lens can, if properly designed, result in higher resolution images.

In optical film processes, anamorphic projection requires either an anamorphic camera lens or an anamorphic printing lens. Either of these lenses can contribute to loss of quality. The anamorphic camera lens contributes loss because it must be designed to operate over a range of object to lens distances. Consequently, there is a loss in resolution to meet the requirements of both anamorphic and variable object to lens distance. The printing lens contributes to quality loss because it requires a reduction of film area in the camera gate.

The digital intermediate process can both introduce the anamorphic step electronically in the correction stage 24 and avoid the loss of quality by compensating for the reduction of film camera area, that is, by digitally scaling the digital scene data anamorphically to provide an image that makes full use of the available film space on the film.

Fortunately, the range of object to lens distances (that is, screen to lens distance) is not as large for a projector lens as for a camera lens. Thus, because the design is less constrained, well-designed projector lenses are generally sharper than well-designed camera lenses.

Projecting with Emulsion Towards the Lens

Figure 5A:
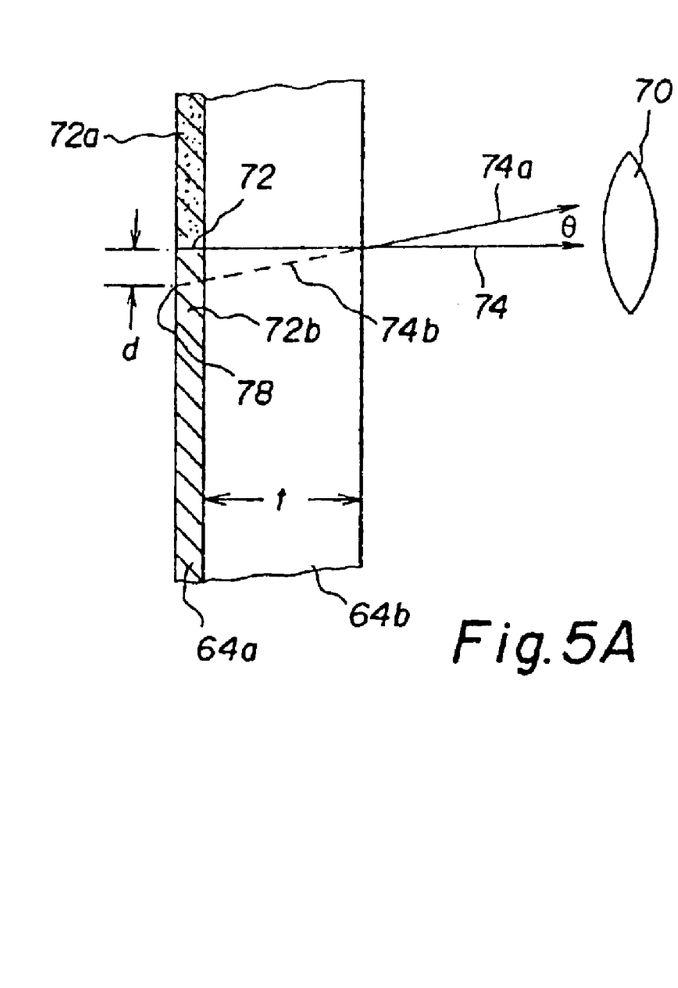
FIGS. 5A and 5B are diagrams showing how an emulsion facing towards the projector lens results in higher image quality.
Figure 5B:
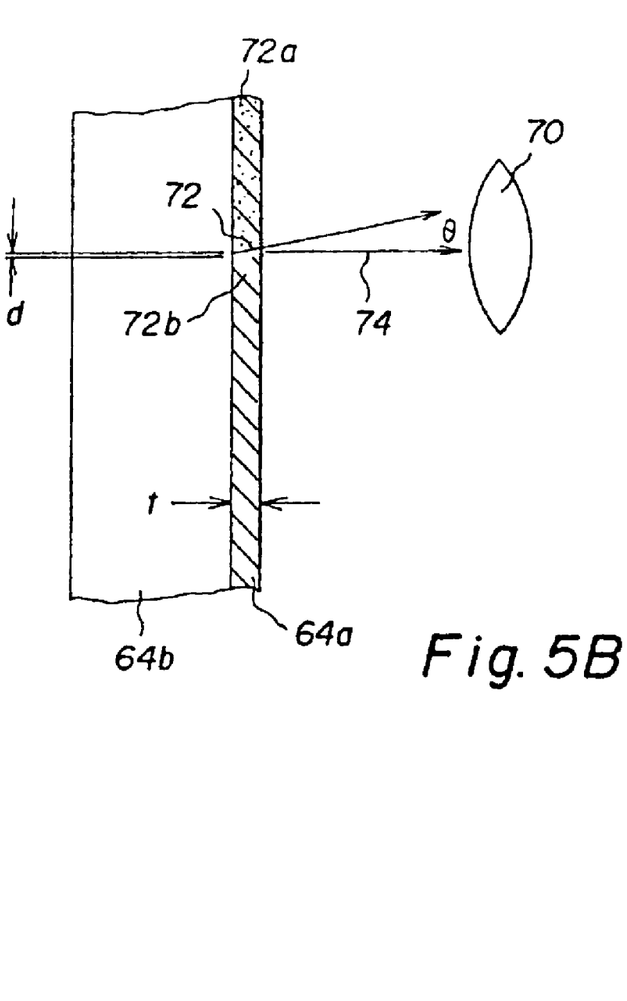

In FIGS. 5A and 5B, a cross-section of the film 60 shows in two views an image-bearing emulsion 64a on a film base 64b, all in spatial relationship with the projection lens 70. FIG. 5B shows diagrammatically the reason why the emulsion 64a facing towards the projector lens 70 results in higher image quality. Alternatively, FIG. 5A shows diagrammatically the reason why the emulsion 64a facing away from the projector lens 70 results in lower image quality. Consider when the emulsion layer carries the image of an edge 72 that represents a transition between a dark area 72a and a light area 72b. A light ray 74 leaving that edge and going towards the lens 70, if not deflected by the roughness of the base surface of the film, will continue uninterrupted towards the lens and with no loss of resolution. However, referring to FIG. 5A, if the base roughness causes the light ray to be deflected (74a) by a small angle θ, then the lens 70 is not able to distinguish the deflected ray 74a from a ray 74b passing directly along this deflected path. Therefore, the ray will appear to originate on the image-bearing emulsion 64a from an apparent position 78 away from the edge 72. Thus, due to roughness the lens will image the edge as smeared, by a distance d, on each side of its actual position, where d equals $$d = t * \theta$$

and where t is the distance of the rough surface away from the emulsion. By turning the emulsion towards the lens, as shown in FIG. 5B, distance d is substantially reduced, because t changes from the base thickness of mils or 178 microns to about 10 microns, an 18-fold improvement. Another advantage of this approach is that it allows more uniform heating of the film across its thickness, reducing by 10% to 15% the amount of heat in the emulsion.

Positioning the emulsion towards the lens is impractical with conventional optical processing. As the emulsion of the origination negative is towards the camera lens, a direct contact print made with the negative must be away from the lens to ensure correct lateral inversion. However, if a scanning and recording step is introduced, it is possible to laterally invert the image digitally in the correction stage 24. Consequently, and in accordance with the invention, the present method includes the step of digitally reversing the image before recording the scene data back onto film so that the film in the projector may have its emulsion towards the projection lens. The image orientation then is correct when the print is threaded in the projector with the emulsion towards the lens.

Electronic Distribution

Similar issues arise in electronic distribution. Known losses in these systems include electronic projection lens flare, lack of sharpness or sharpness uniformity, aliasing artifacts and similar issues that can be precompensated for in the postproduction process. The effects that may be applied include precompensated filtering techniques, noise reduction, full aperture scanning (in the case of film) and other techniques discussed herein to both data from electronic scanners and cameras.

Grain and Noise

Another key element is the film grain perceived by the viewer.

Grain on the screen arises primarily from grain in camera negative film. In larger film formats, grain appears perceptually smaller and therefore less noticeable because there is less magnification of the film onto the screen. Thus, the grain is not magnified to the same extent. To achieve the appearance of 70-mm grain in a 35-mm format requires that the amplitude of the grain be reduced significantly. Fortunately, this can be done electronically using motion compensated noise removal techniques in the noise removal stage 20.

The principle of motion compensated noise removal is to digitally add, across a number of frames, the intensity of the same point in the scene. Just as a pollster improves the accuracy of his poll by interviewing more people, so by determining the digital value of a scene at the same point across multiple frames, a more accurate representation is obtained of the original scene. The challenge is that because various elements of the scene move in different directions, the same point is in a different position in each frame. A method for tracking the movement of every point in the scene across multiple frames is used to identify corresponding scene points across a group of frames. Such a method is described in commonly-assigned U.S. Patent Application Publication No. US2002/0109788 A1, entitled "Method and System for Motion Image Digital Processing" and published Aug. 15, 2002, which is incorporated herein by reference.

Figure 6:
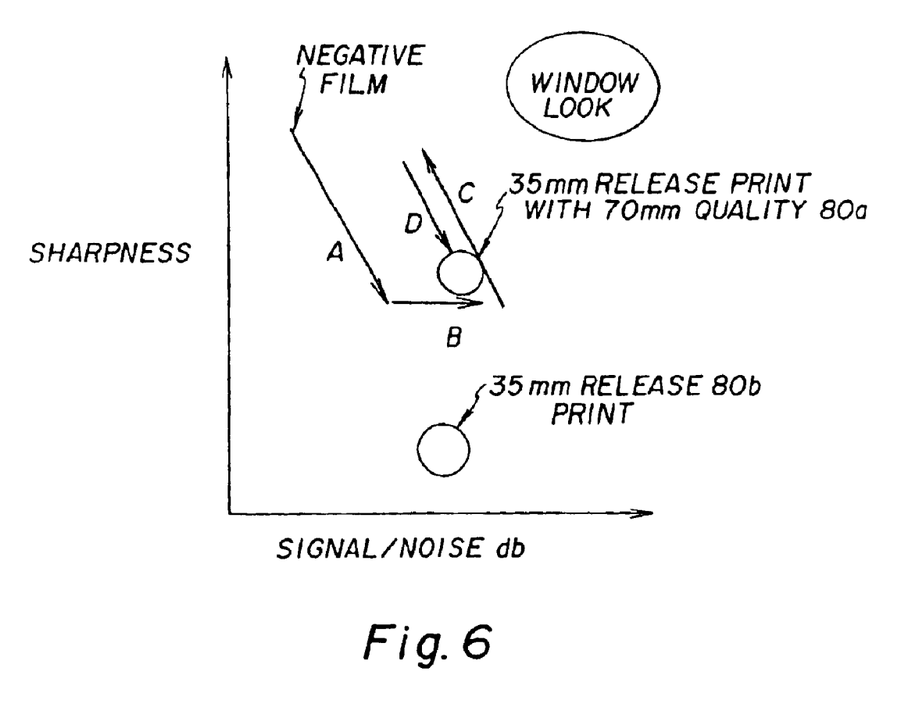
FIG. 6 is a graphical illustration of the effect of using the invention according to FIG. 1 to achieve the appearance of 70 mm grain in a 35 mm format.

The results of this relationship are shown diagrammatically in FIG. 6. This figure is based on the concept that at every point in the chain of an imaging system, there is image information that has both a specific acutance and a specific noise level.

Noise can be described in terms of the amount of noise power in the signal representing the image at the specific point—assuming of course that the original image has no noise. The horizontal axis of FIG. 6 is plotted as a function of the log of the power of signal/noise, in a unit called db or decibels. This is not a perceptual measure; however, it provides a way to rank the amount of noise between specific system elements. It is also assessed at two picture heights.

In the plot shown in FIG. 6, less noise or grain is to the right. Thus, the image that would appear to look the same as seeing the scene through a window would be represented by a point positioned at top right of the figure.

For film systems, noise is introduced by grain and is often considered perceptually desirable, especially in motion pictures. It is therefore difficult to know the ideal amount of grain reduction to apply. Therefore, the principle already stated is used, namely, that in order to improve quality while maintaining a filmic look the system will target the values measured in larger format films.

Each point in FIG. 6 represents a point in a specific motion location in the imaging system chain. Once a negative and film format is chosen, each step (that is camera step, negative step, scan step, etc.) in each system, moves along the dotted line defined for that specific negative or step. Larger formats follow lines further to the right. Furthermore, with larger formats the individual points do not advance down these lines as far as smaller formats. This means that as an image is passed through a larger format system it maintains more detail.

The disk 80a at the end of arrow D corresponds to the position reached by the 70 mm release print on Eastman Kodak 5245 film whereas the circle 80b corresponds to the position of the release print on 35 mm format Eastman Kodak 5245 film. Thus to achieve the quality of 70 mm, the path A, B, C, D is followed to produce a theatrical image with acutance and noise levels corresponding to the position of the 70-mm release disk 80a.

Arrow A corresponds to capturing the scene onto Eastman Kodak 5245 film in the camera stages 14 and 16 and scanning it with the 4K scanner 18. Arrow B corresponds to noise removal in the stage 20 using motion compensated noise removal. This has the effect of reducing the grain, possibly to the extent that some grain signal at certain frequencies may be required to be restored to achieve a filmic look. Arrow C corresponds to digital sharpening in the sharpening stage 22 and arrow D is the high resolution recording, release printing and projection of the image in the stages 26 through 32. Thus with these steps the 35-mm circle 80b is moved to the 70-mm disk 80a.

Motion compensated noise removal used in arrow B is a quite recent development (see, for example, the aforementioned U.S. Patent Application Publication No. US2002/0109788 A1, Ozkan, M. K., Sezan, M. I., Erdem, A. T., and Tekalp, A. M., "Multiframe Wiener Restoration of Image Sequences", in *Motion Analysis and Image Sequence Processing*, edited by M. I. Sezan and R. L. Lagendjik, Kluwer Publishers, 1993; *Digital Video Processing*, A. M. Tekalp, Prentice Hall, 1995; Ozkan, M. K., Sezan, M. I. and Tekalp, A. M., "Adaptive motion-compensated filtering of noisy image sequences," *IEEE Transaction on Circuits and Systems for Video Technology*, vol. 3, no. 4, August 1993, pp. 277–290). Although this technique has not yet reached a level of performance that is sufficiently artifact free to be fully acceptable for feature film applications, it is expected that with further development, artifacts will not be an issue. Nonetheless, its ability to have a significant impact on the overall amount of noise has been demonstrated.

All pictures taken electronically or on film exhibit some degree of noise or "graininess" because of the discrete crystals of silver halide in the photographic emulsion. In still image photography, this graininess may be imperceptible in a typical 3"×5" print. In motion picture imaging, the random nature of the grain structure will cause successive frames of the same scene to "sparkle" or "boil". Aggravating the problem is the fact that motion pictures are displayed with high magnifications making graininess more visible for theatre-goers seated closer to the screen. Small film areas (e.g. 8 mm, 16 mm) require more magnification to fill a movie screen thus magnifying the grains. Moreover, noise accumulates with each intermediate stage of film transfer as the image chain progresses from capture to release print.

As already discussed in this application, thanks to the advent of digital image processing, it is possible to design filters to reduce noise in a digital image by sampling the same image across multiple frames. Many modem movies involve some form of digital intermediate where the image is digitized using a film scanner. The digital intermediate stage is required for inserting computer graphics into live action shots and for a variety of special effects. The pixels in every frame of a movie can be altered before being printed back to film.

Well-known techniques for filter design can be applied to filtering of motion picture sequences. The difficulty lies in designing a filter that leaves the desired image content intact while removing the undesirable noise. As there is normally some degree of "art" to filtering because the process can change the "look" of the image, the filters are adjusted to emulate larger film formats.

Figure 7:
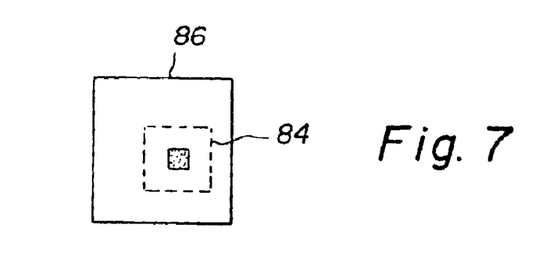
FIG. 7 is a graphical representation of a region of support from which to collect pixel samples for motion compensated noise removal as provided according to FIG. 1.
Figure 8A:
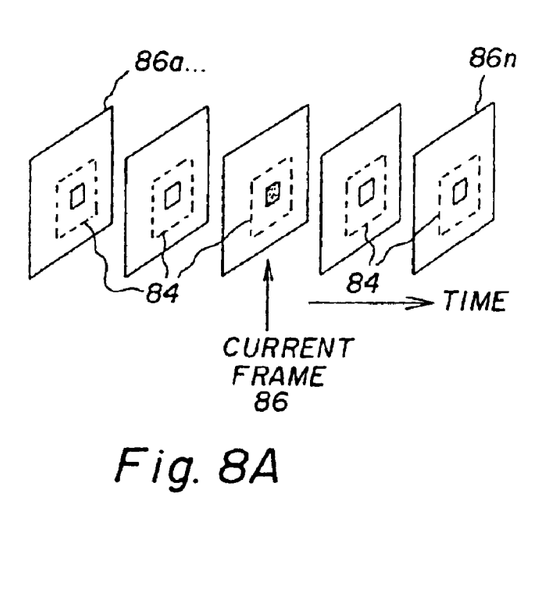
FIGS. 8A and 8B are graphical representations of spatio-temporal regions from which to collect samples for a fixed window (FIG. 8A) and a motion-compensated window (FIG. 8B).
Figure 8B:
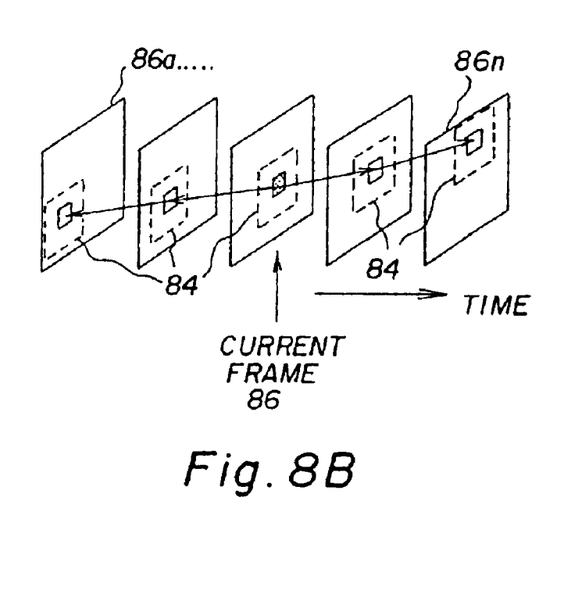

Several distinct filtering approaches can be used for motion picture sequences. The different permutations of filters are obtained by answering two questions: "where are the samples collected from?" and "how are the samples used to create a filtered pixel value?". In answering the first question, image scientists usually refer to the region of support of the filter, which defines the spatial and temporal domain from which samples are collected. As shown in FIGS. 7 and 8, a region of support 84 is usually a rectangular window for a single frame 86, or a series of windows for multiple frames 86a ... 86n. FIG. 7 shows a typical spatial region of support 84 for a current frame 86, and FIGS. 8A and 8B show two ways of extending that region temporally.

As evident in FIG. 8, an image sequence can be treated as a stack of still images 86a . . . 86n. Samples may be collected from the local spatial neighborhood in the current frame 86 as well as from adjacent frames both ahead and behind the current frame 86. Because of motion of objects in the scene, the windows 84 in the adjacent frames may actually contain samples from some other object or the background. As shown in FIG. 8B, motion compensated filtering attempts to move the windows 84 in adjacent frames according to the underlying object's motion. If the motion is not known, then a fixed window 84 is often used, as shown in FIG. 8A.

There are different tradeoffs involved with choosing the support of the filter. These tradeoffs include computational requirements and desired filtering characteristics. As the size of the spatial support increases, an image tends to become blurrier. When extending a window into the temporal domain without motion tracking, large motions such as fast-moving objects or camera pans can be blurred. The optimal method for filtering is to track each object and region in a scene and use those tracked samples to form the filtered estimate. Tracking regions through a sequence is a technically challenging problem and requires substantial computational effort. Unfortunately, motion-compensation can introduce the possibility that motion artifacts may tend to appear as warping or distortion of the filtered image.

Once the samples are collected, a filtering method such as averaging is used to compute the filtered pixel values. Widely used filtering methods include k-nearest neighbors, sigma-filtering, and adaptive weighted averaging. Again, selection of one filter over another depends upon requirements such as speed and allowable filtering artifacts.

In summary, there are numerous methods for reducing the amount of noise or grain in motion images. This toolbox of techniques offers a wide range of noise reduction capabilities. The choice of filter should be based on the desired final look of the image sequence and on the amount of filtering needed.

Implementing this algorithm requires significant compute power a level that is now feasible at today's processing levels. Alternative implementations may use either custom designed ASICs (applications specific integrated circuits), FPGAs (Field Programmable Gate Arrays) or multiple DSPMs (Digital Signal Processing Modules) or multiple processor arrays. Finally, it is interesting to note that because compute power can be expected to grow by a factor of 100 or more over the next 17 years, the cost of implementing these types of algorithms can be expected to drop dramatically.

Steadiness

Steadiness requires that the mis-registration of the image on the film be minimized at each step. It also requires that successive frames stop at the same X-Y position in the projector film gate.

We assume that the mechanical X-Y registration of the film in the gate, measured in microns, is the same for all formats. Consequently, a 2-fold improvement in steadiness is required in the vertical direction and a 2.4 times improvement is required in the horizontal direction for 35-mm film to match 70-mm film.

Extensive measurements of 35-mm film steadiness have been made. Thanks to the larger film format, the projection magnification of 70-mm film is less than that for 35-mm film and so the image will appear steadier. To achieve the required improvement in steadiness in the vertical direction, a 1.5 anamorphic lens for 1.85 format is used by the projector 32 to reduce the magnification in the vertical direction and therefore reduce the unsteadiness.

Improvements in steadiness are also achieved thanks to motion compensated jitter removal. This will remove the unsteadiness introduced by camera and scanner. In addition, reducing the number of print steps also reduces unsteadiness.

Dirt

Although it is doubtful that dirt is often a factor to achieve an enhanced look it may be necessary to reduce the impact that dirt has on the viewing experience. The proposed steps to reduce the dirt include:

A. Motion Compensated Frame Averaging

This algorithm, as used in the noise removal stage 20, in addition to reducing noise also significantly reduces the impact of dirt on the negative.

B. Multiple and Intermediate Prints and Since Release Printing Step

Since the process illustrated in FIG. 1 does not need the printing steps of negative to intermediate print and intermediate print to dupe negative, two steps of dirt introduction are avoided. This should further help reduce dirt levels.

C. Dirt Removing Rollers in Projectors

Such rollers are demonstrated to reduce the amount of dirt in projectors and are therefore a worthwhile introduction to achieve the dirt level of 70 mm.

D. Low Wear Gate With Passive or Active Auto Focus Correction

Most film dirt occurs in the projector and much of this is generated in the film gate. Special gates may be retrofitted to existing projectors, which can both control the flutter and reduce the amount of wear on the film and therefore the amount of dirt generated within the projector.

Summary of Changes and Developments

The list below summarizes the changes and developments covered according to this invention. While not all are needed, in any given situation improvements in quality are provided by the following components and functionalities:

High Speed 4K Scanner System Design

Motion Compensated Noise Filter

High speed Digital Intermediate 4K processing

High speed 4K Recorder

Upgrade current release printing

Low wear gate with flutter compensation

Dirt removing Rollers in projectors 1.85 Anamorphic Projection lens

However, from an image quality point of view, analysis shows that the high speed 4-K scanner 18, the digital intermediate 4K processing 12 and the recorder 26 with at least 3K resolution in the horizontal direction are required.

The invention has been described with reference to a preferred embodiment. However, it will be appreciated that variations and modifications can be effected by a person of ordinary skill in the art without departing from the scope of the invention.

What is claimed is:

1. A method for processing motion picture scene data through a motion picture intermediate process in which the scene data is initially acquired from a film or an electronic camera, wherein image losses potentially occur during later stages of the process, said method comprising the steps of:

(a) representing the scene data in a non-linear space; and
(b) compensating for the image losses associated with the later stages at a point in the process before they occur by converting the scene data into an intermediate space representing the space in which the losses occur and filtering the scene data in the intermediate space to compensate the scene data for the losses.

2. The method as claimed in claim 1 wherein the image losses potentially occur during distribution and projection stages of the process and the compensation performed in step (b) is done for losses associated with the distribution and projection stages.

3. A method for processing motion picture digital scene data through a process in which scene data is initially acquired from a film or an electronic camera and ultimately projected onto a screen, wherein image losses potentially occur during distribution and projection stages of the process, said method comprising the steps of:

(a) using digital filtering of the digital scene data to pre-compensate for losses before they occur in distribution and projection;
(b) digitally scaling the digital scene data anamorphically to provide an image that makes full use of the available film space on the film; and
(c) projecting the image on the screen, thereby providing an enhanced image on the screen.

4. The method as claimed in claim 3 in which scene data is acquired from a film camera that exposes consecutive frames of the film and the digital scene data is acquired from a scanner that scans the consecutive frames of the film and the digital data is ultimately recorded back onto frames of film by a film recorder, said method further comprising the step of electronically removing unsteadiness in at least one of the film scanner, the camera and the recorder by digitally processing the image to remove motion between consecutive frames.

5. The method as claimed in claim 3 in which the digital scene data is reproduced on a film having an image-bearing emulsion and the film is projected on the screen in step (c) utilizing a projector having a projection lens, said method further including the step of digitally reversing the image before step (c) so that the film in the projector has its emulsion towards the projection lens.

6. The method as claimed in claim 5 in which scene data is acquired from a camera that exposes consecutive frames of the film and the digital scene data is acquired from a scanner that scans the consecutive frames of the film, said method further comprising the step of electronically removing unsteadiness in at least one of the film scanner and the camera by digitally processing the image to remove motion between consecutive frames.

7. The method as claimed in claim 3 wherein the digital scene data is transferred to a release print for projection, said method further comprising the step of recording multiple intermediate prints from the digital scene data and performing a single printing step to make each release print from an intermediate print.

8. The method as claimed in claim 3 further comprising the step of using motion compensated frame averaging to digitally remove noise.

9. The method as claimed in claim 4 wherein the step (c) of projecting comprises the step of projecting using a projector with automatic focus.

10. The method as claimed in claim 5 wherein the step (c) of projecting comprises the step of projecting using a projector with automatic focus.

11. The method as claimed in claim 6 wherein the step (c) of projecting comprises the step of projecting using a projector with automatic focus.

12. The method as claimed in claim 7 wherein the step (c) of projecting comprises the step of projecting using a projector with automatic focus.

13. The method as claimed in claim 8 wherein the step (c) of projecting comprises the step of projecting using a projector with automatic focus.

14. A method for processing motion picture digital scene data through a process in which scene data is initially acquired from a film or an electronic camera and ultimately projected onto a screen, wherein image losses potentially occur at distribution and projection stages of the process and where the digital scene data is transferred to a release print for projection, said method comprising the steps of:

(a) using digital filtering of the digital scene data to pre-compensate for losses before they occur in distribution and projection;
(b) recording multiple intermediate prints from the digital scene data and performing a single printing step to make each release print from an intermediate print; and
(c) projecting the release print on the screen, thereby providing an enhanced image on the screen.

15. The method as claimed in claim 14 further comprising the step of digitally scaling the digital scene data anamorphically to provide an image that makes full use of the available film space on the film during step (c).

16. The method as claimed in claim 14 further comprising the step of using motion compensated frame averaging to digitally remove noise.

17. The method as claimed in claim 14 wherein the step (c) of projecting comprises the step of projecting using a projector with automatic focus.

18. The method as claimed in claim 15 wherein the step (c) of projecting comprises the step of projecting using a projector with automatic focus.

19. The method as claimed in claim 16 wherein the step (c) of projecting comprises the step of projecting using a projector with automatic focus.

20. A method for processing motion picture digital scene data through a process in which scene data is initially acquired from a film or an electronic camera and ultimately projected onto a screen, wherein image losses potentially occur at various stages in the process, including distribution and projection stages of the process, said method comprising the steps of:

(a) using motion compensated frame averaging to digitally remove noise;
(b) using digital filtering of the digital scene data to pre-compensate for losses before they occur in distribution and projection; and
(c) projecting the image on the screen, thereby providing an enhanced image on the screen.

21. The method as claimed in claim 20 further comprising the step of digitally scaling the digital scene data anamorphically to provide an image that makes full use of the available film space on the film during step (c).

22. The method as claimed in claim 20 wherein the step (c) of projecting comprises the step of projecting using a projector with automatic focus.

23. The method as claimed in claim 21 wherein the step (c) of projecting comprises the step of projecting using a projector with automatic focus.

24. A system for processing digital motion picture scene data initially acquired from a film or an electronic camera and ultimately projected onto a screen, wherein image losses potentially occur during distribution and projection of the scene data, said system comprising:
 (a) a digital filtering stage using digital filtering of the digital scene data to pre-compensate for losses before they occur in distribution and projection;
 (b) a digital scaling stage for digitally scaling the digital scene data anamorphically to provide an image that makes full use of the available film space on the film; and
 (c) a projector for projecting the image on the screen, thereby providing an enhanced image on the screen.

25. The system as claimed in claim 24 in which scene data is acquired from a film camera that exposes consecutive frames of the film and the digital scene data is acquired from a scanner that scans the consecutive frames of the film, said system further including a noise removal stage for electronically removing unsteadiness in at least one of the film scanner and the camera by digitally processing the image to remove motion between consecutive frames.

26. The system as claimed in claim 24 in which the digital scene data is reproduced on a film having an image-bearing emulsion and the film is projected on the screen utilizing a projector having a projection lens, said system further including a stage for digitally reversing the image so that the film in the projector may have its emulsion towards the projection lens.

27. The system as claimed in claim 24 wherein the digital scene data is transferred to a release print for projection, said system further comprising a recording stage for recording multiple intermediate prints from the digital scene data and performing a single printing step to make each release print from an intermediate print.

28. The system as claimed in claim 24 further including a noise removal stage using motion compensated frame averaging to digitally remove noise.

29. A system for processing motion picture digital scene data that is initially acquired from a film or an electronic camera and ultimately projected onto a screen, wherein image losses potentially occur at distribution and projection stages of the system and where the digital scene data is transferred to a release print for projection, said system comprising:
 (a) a filtering stage using digital filtering of the digital scene data to pre-compensate for losses before they occur in distribution and projection;
 (b) a recording stage for recording multiple intermediate prints from the digital scene data and performing a single printing step to make each release print from an intermediate print; and
 (c) a projector for projecting the release print on the screen, thereby providing an enhanced image on the screen.

30. The system as claimed in claim 29 further including a digital scaling stage for digitally scaling the digital scene data anamorphically to provide an image that makes full use of the available film space on the film during projection.

31. The system as claimed in claim 29 further comprising a noise removal stage using motion compensated frame averaging to digitally remove noise.

32. The system as claimed in claim 29 wherein the projector includes automatic focus.

33. A system for processing motion picture digital scene data which is initially acquired from a film or an electronic camera and ultimately projected onto a screen, wherein image losses potentially occur at various stages in the system, including distribution and projection stages of the system, said system comprising:
 (a) a noise removal stage using motion compensated frame averaging to digitally remove noise;
 (b) a filtering stage using digital filtering of the digital scene data to pre-compensate for losses before they occur in distribution and projection; and
 (c) a projector for projecting the image on the screen, thereby providing an enhanced image on the screen.

34. The system as claimed in claim 33 further including a scaling stage for digitally scaling the digital scene data anamorphically to provide an image that makes full use of the available film space on the film during projection.

35. The system as claimed in claim 33 wherein the projector includes automatic focus.

* * * * *